United States Patent
Tho et al.

(10) Patent No.: US 12,202,613 B2
(45) Date of Patent: Jan. 21, 2025

(54) EXTERNAL AIRBAG FOR AN AIRCRAFT AND AIRCRAFT HAVING AN EXTERNAL AIRBAG SYSTEM

(71) Applicant: Bell Textron Inc., Fort Worth, TX (US)

(72) Inventors: Cheng-Ho Tho, Colleyville, TX (US); Michael Reaugh Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 95 days.

(21) Appl. No.: 17/396,382

(22) Filed: Aug. 6, 2021

(65) Prior Publication Data
US 2023/0038209 A1 Feb. 9, 2023

(51) Int. Cl.
*B64D 25/00* (2006.01)
*B64C 25/32* (2006.01)

(52) U.S. Cl.
CPC ........ *B64D 25/00* (2013.01); *B64C 2025/325* (2013.01); *B64D 2201/00* (2013.01)

(58) Field of Classification Search
CPC ................ B64D 25/00; B64D 2201/00; B64C 2025/325
See application file for complete search history.

(56) References Cited

U.S. PATENT DOCUMENTS

| | | | |
|---|---|---|---|
| 5,803,024 A * | 9/1998 | Brown | B01D 27/06 123/41.15 |
| 7,954,752 B2 | 6/2011 | Smith et al. | |
| 8,348,192 B2 | 1/2013 | Tho et al. | |
| 8,418,957 B2 | 4/2013 | Smith et al. | |
| 8,870,115 B2 | 10/2014 | Lu et al. | |
| 9,452,843 B1 | 9/2016 | Lu et al. | |
| 2007/0007384 A1 * | 1/2007 | Sliwa, Jr. | B64D 45/0053 244/30 |
| 2011/0057425 A1 * | 3/2011 | Fink | B60R 21/262 280/730.2 |
| 2011/0204181 A1 * | 8/2011 | Hill | B64D 25/00 244/100 A |
| 2011/0260001 A1 * | 10/2011 | Ferrier | B64D 25/00 244/104 FP |
| 2013/0062465 A1 * | 3/2013 | Hill | B64D 25/00 244/100 A |
| 2015/0041584 A1 * | 2/2015 | Lu | B64D 25/00 244/100 A |
| 2018/0127102 A1 * | 5/2018 | Clarke | B64C 27/006 |
| 2018/0296935 A1 * | 10/2018 | Mowbray | A63H 27/10 |
| 2021/0354806 A1 * | 11/2021 | Kim | B64D 45/04 |
| 2021/0381605 A1 * | 12/2021 | Prathibha | F16K 3/265 |

FOREIGN PATENT DOCUMENTS

EP 2590861 B1 2/2015

* cited by examiner

*Primary Examiner* — Brady W Frazier
*Assistant Examiner* — Shanna Danielle Glover
(74) *Attorney, Agent, or Firm* — Akona IP PC

(57) ABSTRACT

An implementation of an external airbag system may include a plurality of inflatable air bags, a duct coupled to the plurality of inflatable air bags, and an exhaust vent coupled to each of the plurality of inflatable air bags via the duct.

13 Claims, 7 Drawing Sheets

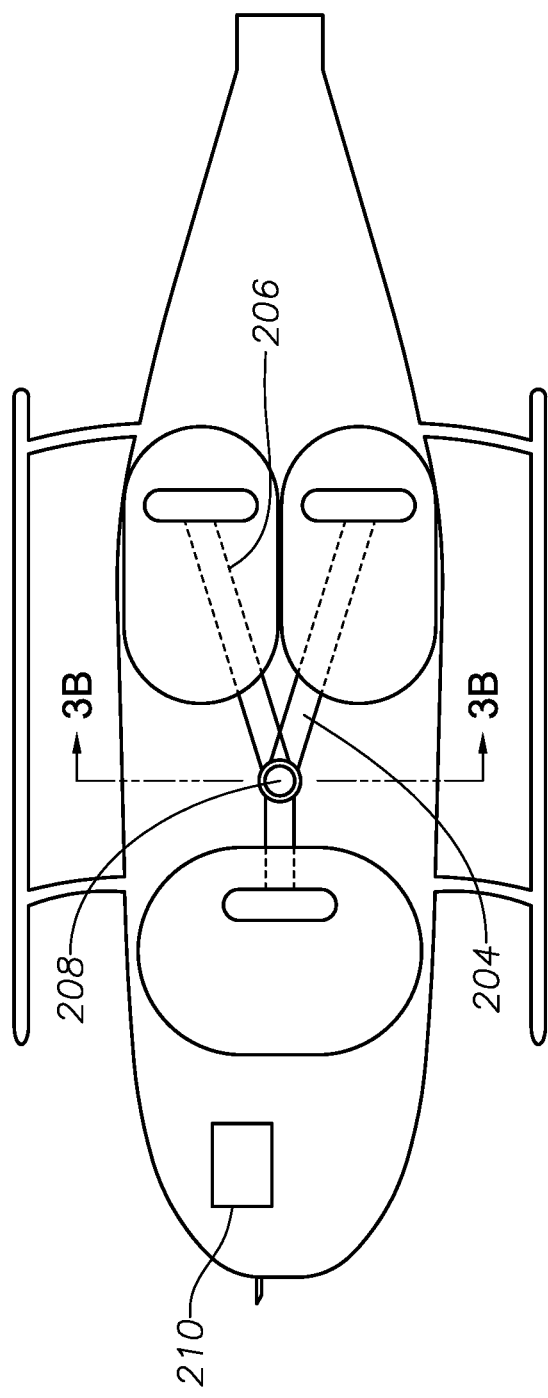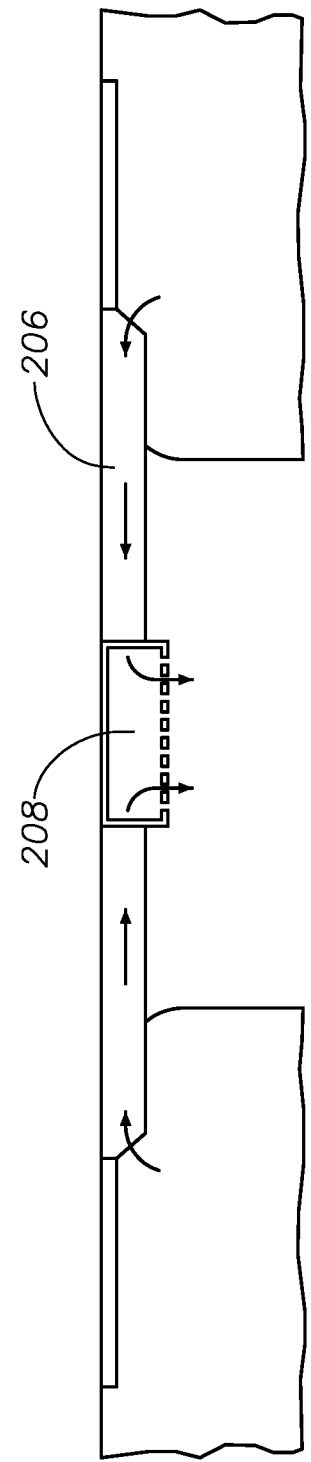
FIG. 3A
FIG. 3B

EXTERNAL AIRBAG FOR AN AIRCRAFT AND AIRCRAFT HAVING AN EXTERNAL AIRBAG SYSTEM

STATEMENT REGARDING FEDERALLY SPONSORED RESEARCH OR DEVELOPMENT

Not applicable.

TECHNICAL FIELD OF THE DISCLOSURE

The present disclosure relates, in general, to emergency landing impact force attenuation in rotary crafts.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Currently, internal airbags are used in the automotive industry within a vehicle's occupied volume to mitigate occupant injuries. Similarly, external airbags have been used to attenuate decelerative loads to air and space vehicles, such as escape modules, upon contact with the ground or water.

During impact, gas in the airbag must be vented to prevent gas pressurization and subsequent re-expansion. This effect is commonly known as rebound. In addition, the gas may be vented to prevent over-pressurization, which can cause failure of the airbag. Venting may be accomplished, for example, through discrete vents or through a porous membrane that forms at least a portion of the skin of the airbag. Although great strides have been made in the area of aircraft impact attenuation systems, many short comings remain.

SUMMARY

An implementation of an external airbag system may include a plurality of inflatable air bags, a duct coupled to the plurality of inflatable air bags, and an exhaust vent coupled to each of the plurality of inflatable air bags via the duct.

A plurality of secondary ducts may be included in the external airbag system. Each of the plurality of secondary ducts may be coupled to a respective one of the plurality of inflatable air bags and each of the plurality of secondary ducts may further be coupled to the exhaust vent via the duct. A valve may be within at least one of the plurality of secondary ducts. The valve may be configured to prevent backflow into the respective one of the plurality of inflatable air bags.

At least one second exhaust vent may be coupled to the plurality of inflatable air bags. A first group of the plurality of inflatable air bags may be coupled to the exhaust vent and a second group of the plurality of inflatable air bags may be coupled to the at least one second exhaust vent.

The exhaust vent may include an exhaust valve that is configured to open in response to application of a minimum amount of pressure build up in the external airbag system. The exhaust vent may include a variable diameter outlet. The variable diameter outlet may be configured to vary in size in response to a condition of an environment surrounding the external airbag system. Each of the plurality of inflatable air bags may be configured to deflate within a finite amount of time after an inflation event. The inflation event may be an increase of pressure within at least one of the plurality of inflatable air bags.

A further implementation may be an aircraft that may include an external airbag system. The external airbag system may be in a compartment in the aircraft's fuselage and may include a plurality of inflatable air bags, a duct coupled to each of the plurality of inflatable air bags, and an exhaust vent coupled to the plurality of inflatable air bags via the duct, and the aircraft may include a sensor configured to detect an inflation event and to emit a signal causing inflation of the plurality of air bags in response to the inflation event.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 3A illustrates a cross-sectional view the rotorcraft of FIG. 1 including an external airbag system, showing ductwork;

FIG. 3B illustrates a cross-sectional view of the external airbag system of FIG. 1.

DETAILED DESCRIPTION

Aircrafts, such as a rotorcraft, that have experienced a loss of power, loss of lift, loss of control or some other potentially catastrophic event may have to make an emergency landing. In the event that an emergency landing is necessary, a rotorcraft may deploy an external airbag system. In some rotorcrafts, multiple airbags may be deployed. The presence of multiple airbags sometimes necessitates simultaneous deployment of each airbag. It is possible that, upon the emergency landing some, but fewer than all, of the airbags deflate. If this occurs, the rotorcraft may tilt in one direction or another. It may even be possible that extreme tilt of the rotorcraft results in a rollover or pitch-over of the aircraft, which may cause injury to passengers inside the rotorcraft.

Figure 1:
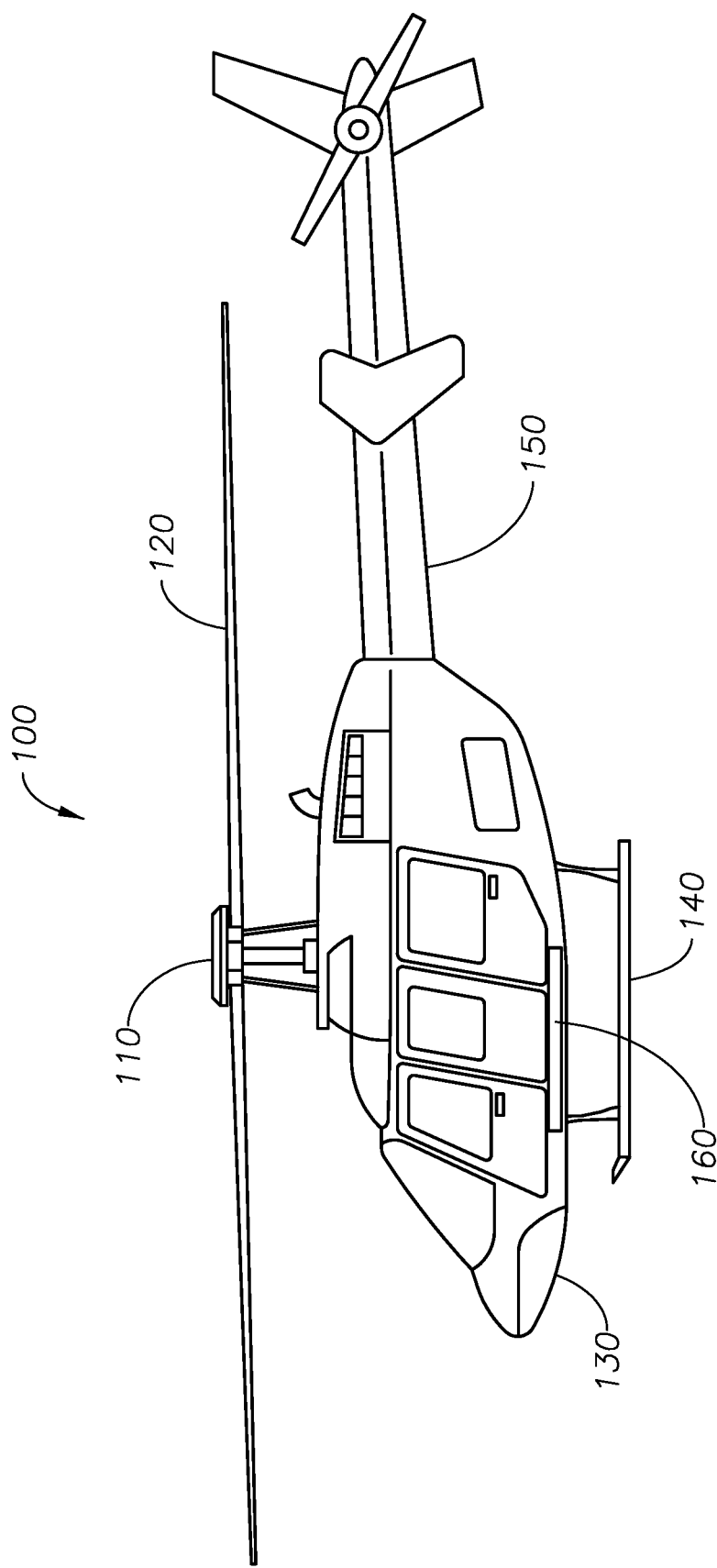
FIG. 1 illustrates a rotorcraft type of aircraft.

FIG. 1 illustrates a rotorcraft 100, i.e., a rotary wing aircraft. Rotorcraft 100 features a rotor system 110, blades 120, a fuselage 130, landing gear 140, an empennage 150 and an external airbag system 160. Rotor system 110 may rotate blades 120. Rotor system 110 may include a control system (not shown) for selectively controlling the pitch of each blade 120 in order to selectively control direction, thrust, and lift of rotorcraft 100.

Figure 2:
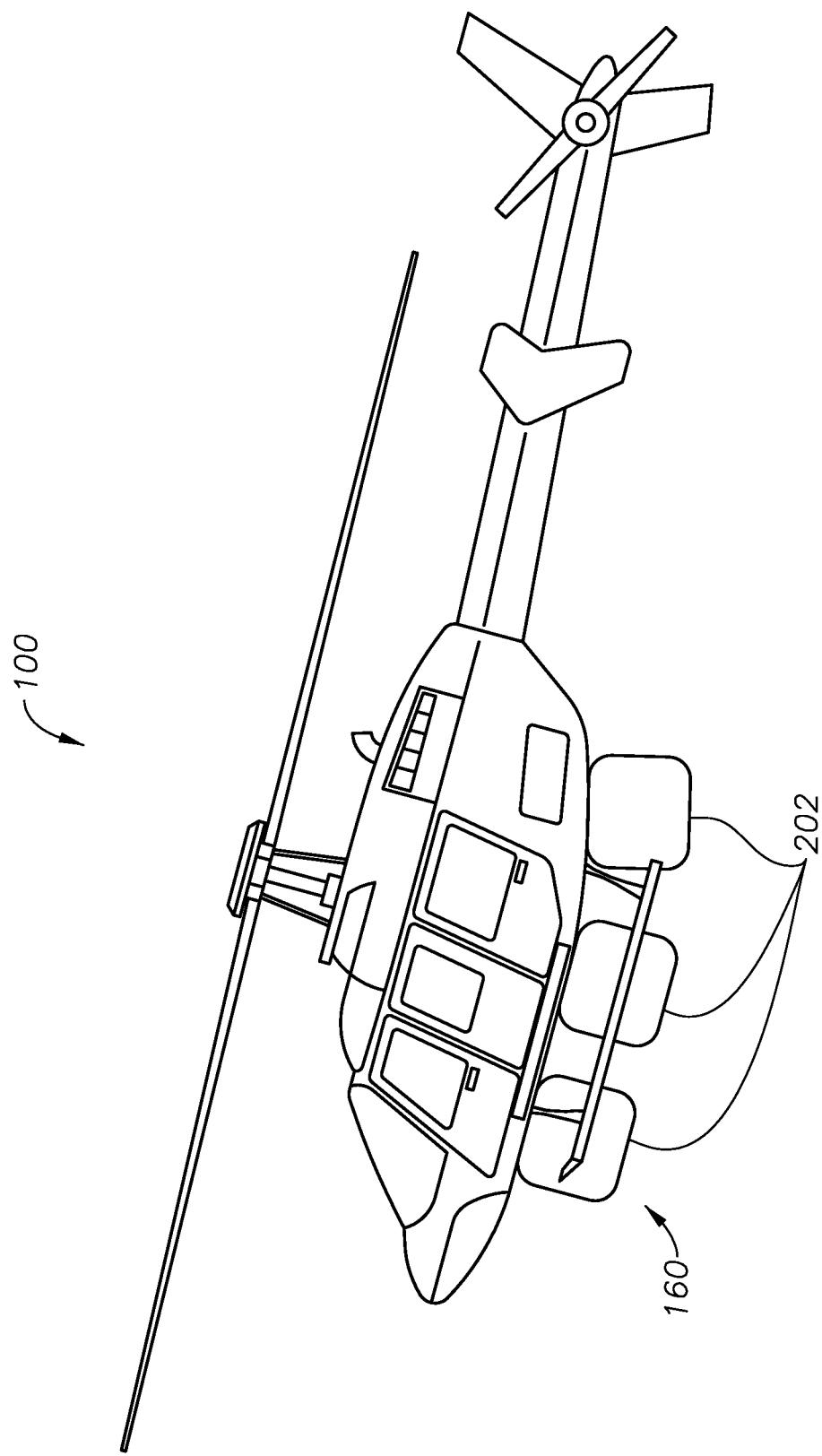
FIG. 2 illustrates the rotorcraft of FIG. 1 including an external airbag system in a deployed configuration.

FIG. 2 illustrates the rotorcraft 100 of FIG. 1 with the external airbag system 160 deployed. The external airbag system 160 may include a plurality of inflatable airbags 202 and a duct 204 (shown in FIGS. 3A and 3B). The duct 204 may be a plenum for secondary ducts, which are described below.

FIG. 3A is a cross-sectional view of the rotorcraft 100 of FIG. 2 and FIG. 3B is a cross-sectional view of the external airbag system 160 of FIG. 2. As illustrated in FIGS. 3A and 3B, the rotorcraft 100 and external airbag system 160 may include a plurality of secondary ducts 206, an exhaust vent 208 and a triggering event sensor 210. Each of the inflatable airbags 202 may be connected to one of the secondary ducts 206. Each of the second ducts 206 may be connected to the duct 204. Duct 204 may contain the exhaust vent 208.

Each inflatable airbag 202 may be positioned within the airbag system 160 in a pre-inflated configuration such as in a folded configuration. The pre-inflated position of each inflatable airbag 202 may be consistent with an expected inflated configuration of each inflatable airbag 202. For example, if six inflatable airbags 202 are used, the uninflated inflatable airbags 202 may be arranged in three rows (from the rotorcraft's nose to the rotorcraft's aft) and two columns (along the rotorcraft's width). If nine inflatable airbags 202 are used, the inflatable airbags 202 may be arranged in a three row, three column configuration, if twelve inflatable airbags 202 are used, the inflatable airbags 202 may be arranged in a four row, three column configuration, and so on.

Regardless of the number of inflatable airbags used, all of the inflatable airbags 202 may have a combined area that is at least substantially equal to a cross-sectional area of an underbelly of the rotorcraft 100. In some implementations, all of the inflatable airbags 202 together may occupy an area that is larger than an underbelly of the rotorcraft 100. For example, if the rotorcraft 100 has an underbelly that is twelve feet long by six feet wide (an area of seventy-two square feet), all of the inflatable air bags 202 together may occupy an area of seventy-two square feet. If, for example, six air bags 202 are used, each inflatable air bag 202 may have an inflated length of four feet and an inflated width of three feet and they may be arranged in three rows and two columns.

It is not necessary, however, that all of the inflatable airbags 202 be equal in size. There may be some circumstances that require different sized inflatable airbags 202. For example, in circumstances in which a configuration of the rotorcraft 100 will not allow for the inflatable airbags 202 all being equal size, a forward inflatable airbag (or an inflatable airbag at another section of the rotorcraft) may be twice as large as the remaining inflatable airbags, half as large as the remaining inflatable airbags, three times as large as the remaining inflatable airbags, a third as large as the remaining inflatable airbags, etc.

Figure 4:
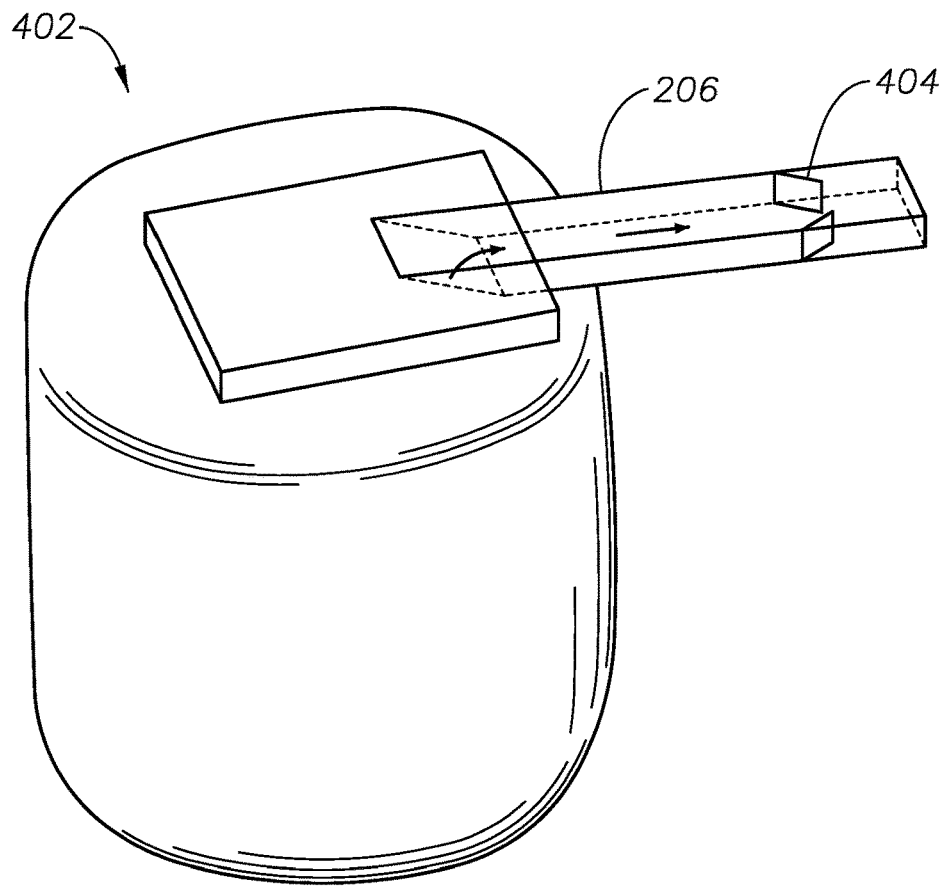
FIG. 4 illustrates a portion of the external airbag system including an inflatable airbag and duct.

FIG. 4 illustrates an "external airbag—secondary duct" assembly 402 of the external airbag system 160 in an inflated configuration. Each of the plurality of secondary ducts 206 may include a check valve 404 in between the air bag and the duct 204. The check valve 404 may be positioned within the secondary duct 206 so that it allows fluid flow only from the inflatable airbag 202 to the duct 204. Backflow from the duct 204 to the inflatable airbag 202 may be prevented by the check valve 404.

Figure 5A:
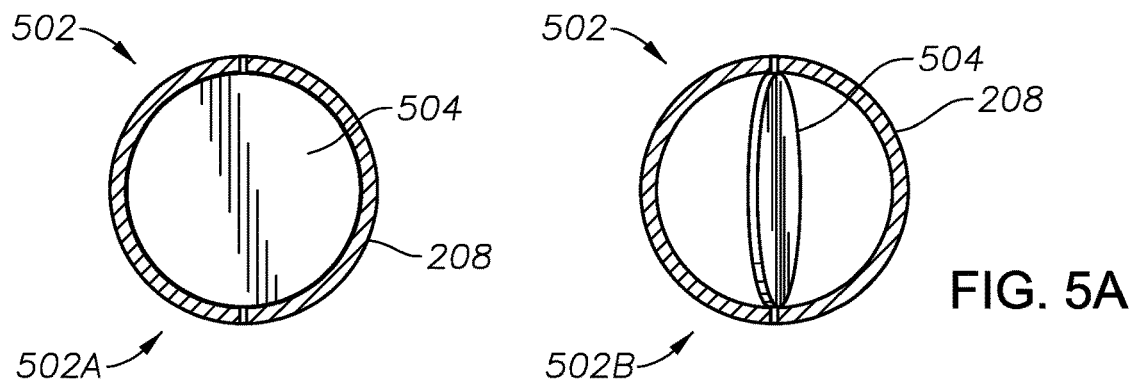
FIG. 5A illustrates an implementation of an exhaust vent.

FIG. 5A illustrates an implementation of the exhaust vent 208 for the external airbag system 160. The exhaust valve 502 may include a flap 504, which may be in a closed configuration 502a or in an open configuration 502b. The flap 504 may be hingedly connected to the exhaust vent 208 either at a circumferential position of the flap 504 or, as illustrated, at a diametrical position. The flap 504 may be configured to partially open or to fully open depending on the desired amount of fluid flow through the vent 208.

The flap 504 may be configured to open in response to an application of a minimum amount of pressure that builds up in the external airbag system 160. For example, upon deployment of the inflatable airbags 202, an inflating medium may still be transmitted to the system 160. Once the inflatable airbags 202 are full, pressure may be expelled through the exhaust valve 502.

In some implementations, the exhaust vent 208 may lack a valve. The exhaust vent 208 may therefore be in constant fluid communication with a surrounding environment.

Figure 5B:
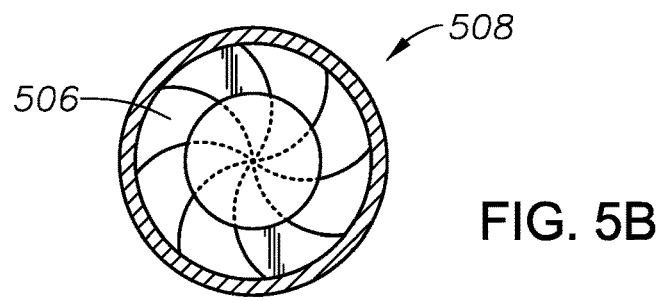
FIG. 5B illustrates a further implementation of an exhaust vent.

FIG. 5B illustrates a further implementation of the exhaust vent 508. A variable sized outlet 506 may alternatively be used in the external airbag system 160. For example, pressure within the system may be affected at different altitudes of the rotorcraft 100. If for example, an emergency landing occurs in the mountains, which may be many thousands of feet above sea level, the pressure within the external airbag system 160 may be different than if an emergency landing occurs at sea level. The variable diameter outlet 506 may help maintain a proper exhaust flow rate of the external airbag system 160 by accounting for the differences in pressure at different emergency landing elevations of the rotorcraft 100. The variable sized outlet 506 may be any shape such as circular, rectangular, asymmetric, oval, triangular, etc.

The variable diameter outlet 506 may include a tube (not shown) that may be cinched or loosened using a tie or other tightening mechanism. Other forms of variable diameter outlets may include, as illustrated, a series of plates that may rotate toward or away from each other in response to a mechanical spring mechanism or an electrical signal being controlled by a controller.

Figure 6:
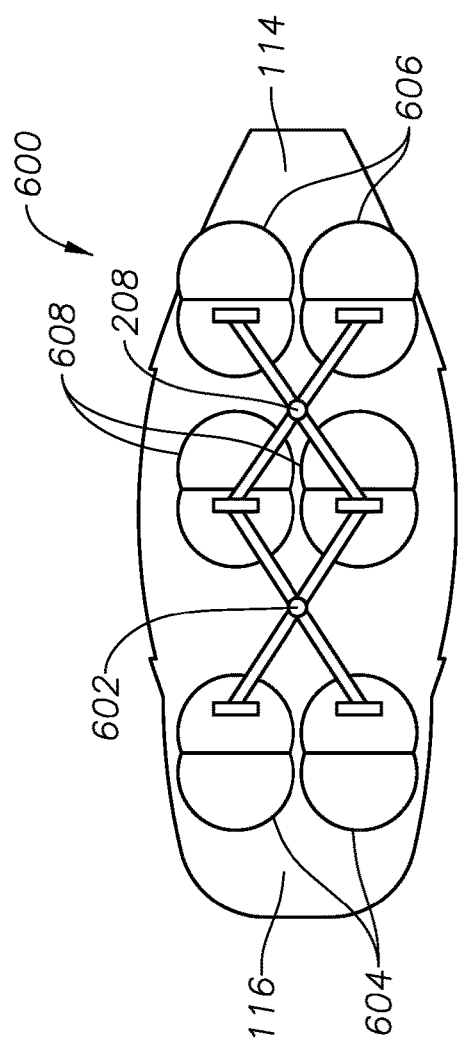
FIG. 6 illustrates a further implementation of the external airbag system.

FIG. 6 illustrates an implementation 600 in which multiple outlets may be used. For example, in addition to the exhaust vent 208, at least one second exhaust vent 602 may be included in the system 600. In some implementations with two exhaust vents, an entire system may be completely independent of the other system(s). For example, a single rotorcraft may have two external airbag systems 160 in which the rotorcraft 100 may have two sets of inflatable airbags, two triggering sensors, two exhaust vents and two sets of ducts, etc., that are completely separate from each other. In some implementations that are fluidly independent, triggering of each independent system may be via independent triggering sensors as noted here or via a single triggering sensor.

In other implementations, two or more systems may be completely integrated. For example, as illustrated in FIG. 6, the system may include both of the exhaust vents 208 and 602. A first group of Inflatable airbags 604 at a forward portion of the aircraft 100 may be, based on position in the system, primarily fluidly coupled to exhaust vent 602. The first group of inflatable airbags 604 may also be fluidly coupled to the exhaust vent 208 but exhaust vent 208, due to its distance from the first set of inflatable airbags 604 may be a secondary exhaust vent for the first group of inflatable airbags 604. A second group of inflatable airbags 606 at an aft position of the aircraft 100 may be, based on position in the system, primarily fluidly coupled to exhaust vent 208. The second set of inflatable airbags 606 may also be fluidly coupled to the exhaust vent 602 but exhaust vent 602, due to its distance from the second group of inflatable airbags 606 may be a secondary exhaust vent. A third group of inflatable airbags 608 may be, based on position in the system, equally fluidly coupled to both the exhaust vent 208 and the exhaust vent 208.

Figure 7A:
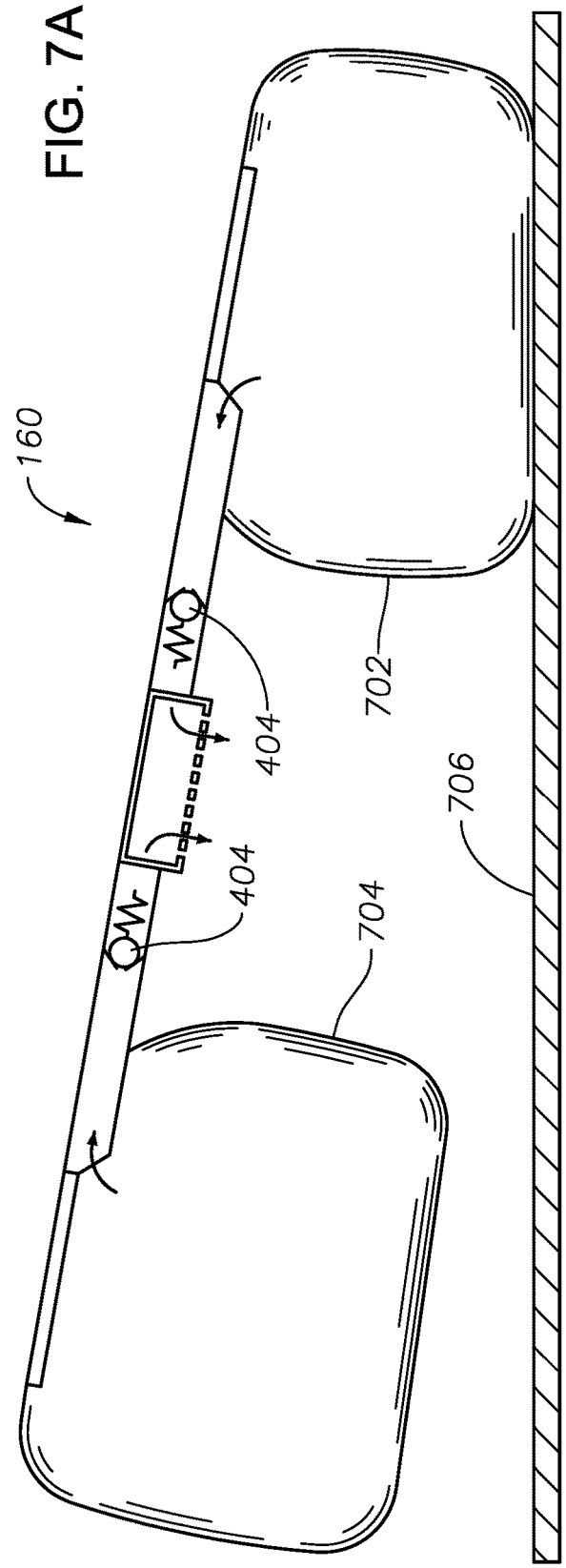
FIG. 7A illustrates an implementation of the external airbag system in a deployed configuration.
Figure 7C:
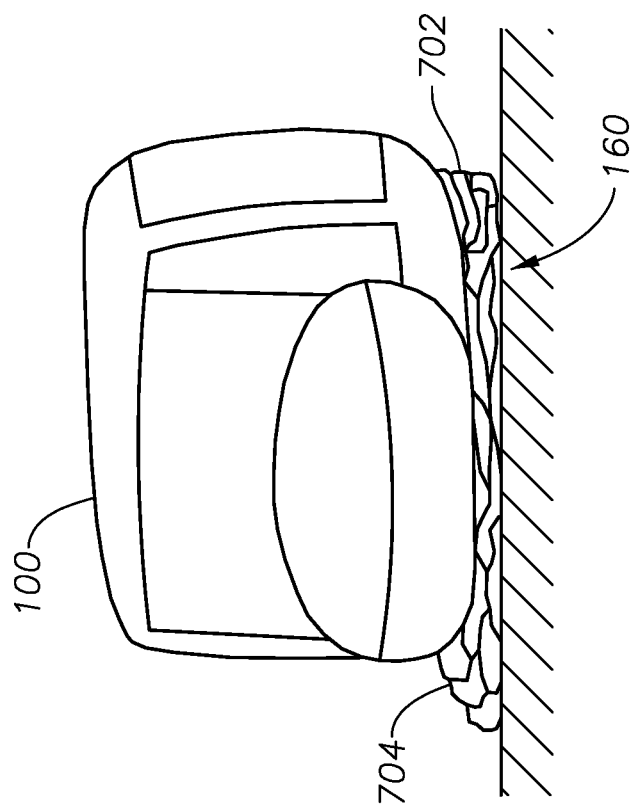
FIG. 7C illustrates a rotorcraft in an emergency landing and having an implementation of the external airbag system.
Figure 7B:
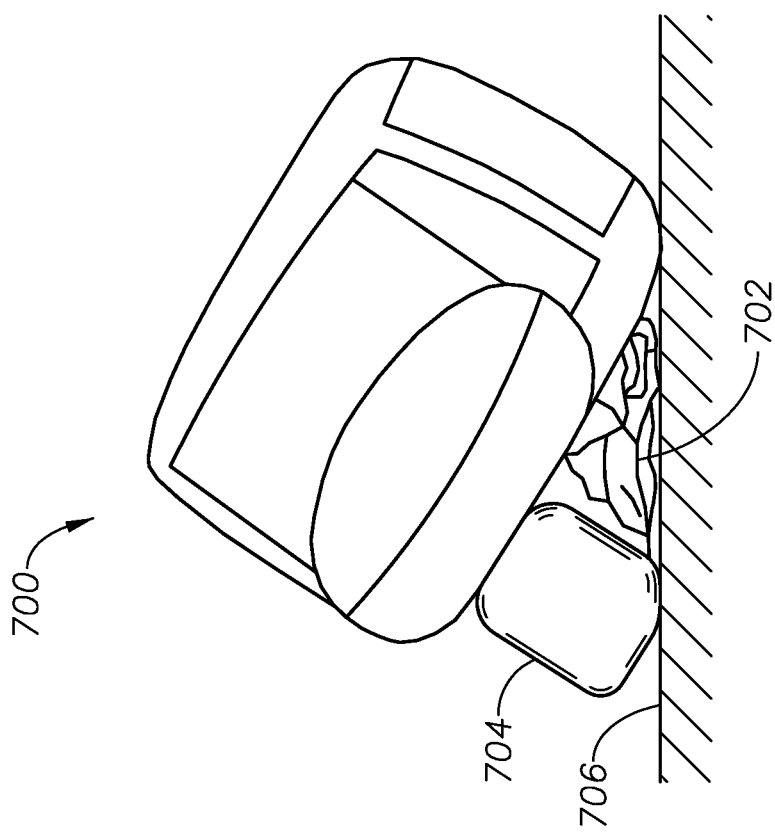
FIG. 7B illustrates a rotorcraft in an emergency landing and having a prior art external airbag system.

With reference to FIGS. 7A-7C, the system may be configured so that all of the inflatable airbags 202 deflate in response to an impact event at substantially the same time. For example, the check valve 404 may be configured to open in response to a lower pressure than the exhaust vent 208 (for the purpose of this discussion, only exhaust vent 208 is referenced; however, it is understood that this discussion applies equally to implementations having at least one second exhaust vent 602). Therefore, pressure within the system 160 does not have to be reduced until pressure is balanced throughout the entire system, including each of the inflatable airbags 202. Upon a balanced pressure within the system, the pressure will be high enough to cause the exhaust valve 502 to open.

FIG. 7A is a view of the system 160 from the viewpoint of looking at the front of the rotorcraft 100. Therefore, the right side of the image of FIG. 7A corresponds with a left side of the rotorcraft 100 and a left side of the image of FIG. 7A corresponds with a right side of the rotorcraft 100.

FIG. 7A illustrates the system in which the inflatable airbags 202 are deployed. In an unlevel emergency landing of the rotorcraft 100, inflatable airbag 702 is illustrated contacting an impact surface 706, e.g., ground, a helipad, etc., before secondary impact inflatable airbag 704. As an emergency landing is chaotic and often difficult to control, unlevel emergency landings are common. In prior art systems, during an unlevel emergency landing (if inflated inflatable airbag 702 were a part of a prior art system), inflatable airbag 702 would be on the initial impact side of the rotorcraft 100. Due to its position as the initial impact inflatable airbag, inflatable airbag 702 would automatically lose much of its inflation and absorb the energy of impact of the rotorcraft 100.

The secondary impact side occupied by inflatable airbag 704 may or may not deflate as a result of its own contact with the impact surface 706. The inflatable airbags all may require a threshold "pop pressure" before they will deflate. Depending on how much energy is absorbed by the impact airbag 702 from the impact event, the secondary impact airbag 704 may not receive enough energy from the impact event to reach the pop pressure as all of the necessary energy may have been absorbed by the impact side external airbag 702. Therefore, the secondary impact side external airbag 704 may remain inflated. If the external airbag remains inflated, it may cause the rotorcraft 100 to remain in an unlevel position throughout the emergency landing and even after the rotorcraft 100 comes to rest.

FIG. 7B illustrates a rotorcraft 700 having a prior art system. As discussed above with respect to FIG. 7A, the inflatable airbag 702 on the impact side of the rotorcraft has impacted an emergency landing surface 706 and has deflated. However, the inflatable airbags 704 on the right side of the rotorcraft have not deflated. As a result, the rotorcraft 700 is prone to rollover after the emergency landing thereby posing a risk to occupants of the rotorcraft 700 while still in the rotorcraft 700 and when trying to exit the rotorcraft 700.

FIG. 7C illustrates the rotorcraft 100 having the present system 160. The inflatable airbags 702 on the initial impact of the side of the rotorcraft 100 deflate at the same time as the inflatable airbags 704 on the secondary impact side of the rotorcraft 100. Therefore, tendency of the rotorcraft 100 to rotate is greatly diminished and the occupants of the rotorcraft 100 are in less danger during the emergency landing and upon exiting the rotorcraft 100 after the emergency landing.

Figure 8:
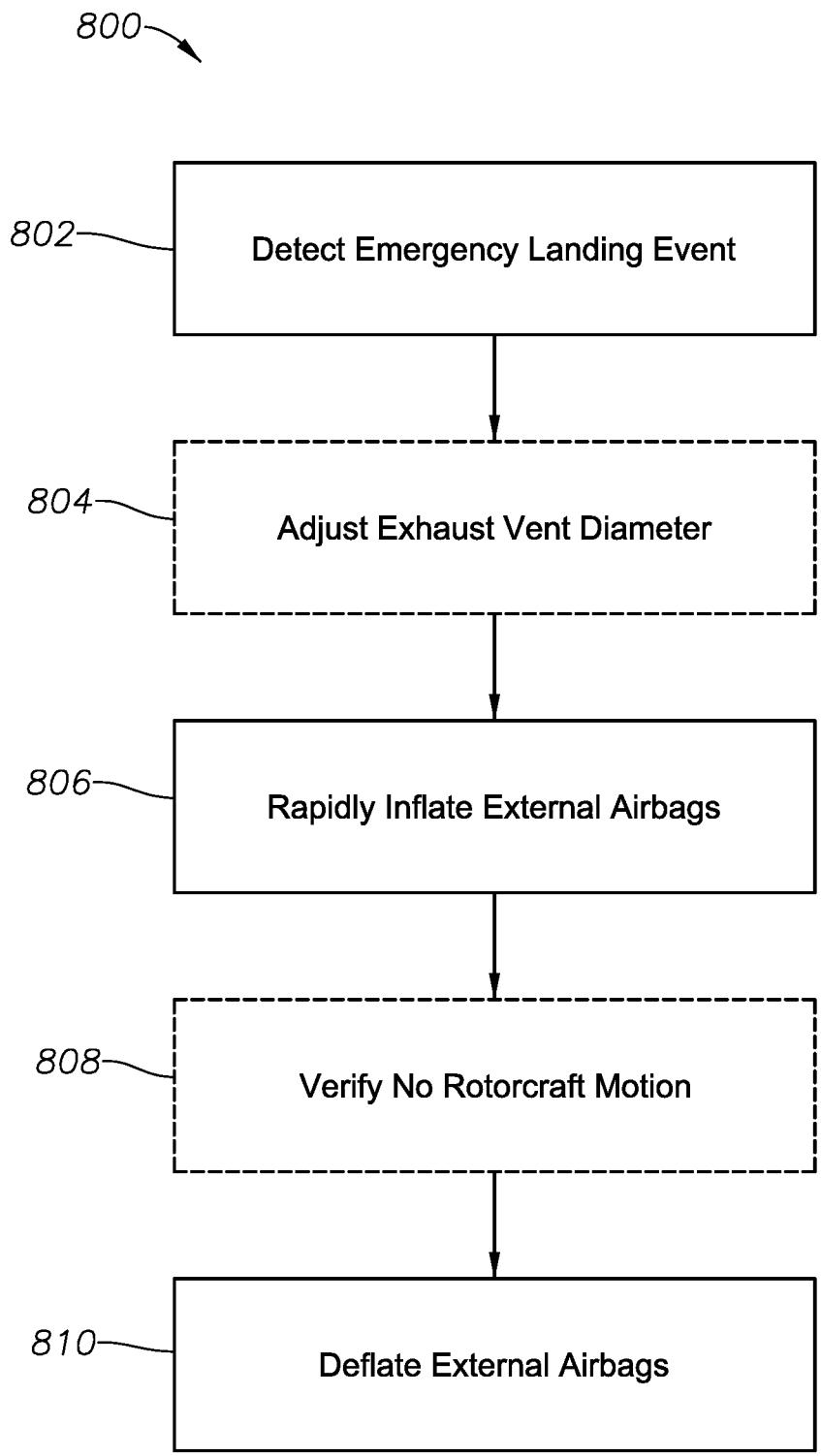
FIG. 8 illustrates a method of operation of the external airbag system.

Operation of the system 160 will now be discussed with respect to the method 800 illustrated in FIG. 8.

At step 802, the triggering event sensor 210 detects an emergency landing event. For example, the triggering event sensor 210 may be a pressure or temperature sensor that detects a rapid change in pressure or temperature thereby identifying a potential emergency event. The triggering event sensor 210 may be the altimeter that is assigned the function of signaling to a controller that deployment of the system 160 may be required if altitude continues to change a threshold amount within a threshold amount of time without detecting a corresponding signal from the rotorcraft's controls. The triggering event sensor 210 may also (or instead) be an accelerometer that detects rapid changes in velocity, pitch angle and/or roll angle of the rotorcraft 100 without detecting a corresponding signal from the rotorcraft's controls. A single triggering event sensor 210 may be used or multiple sensors may be used for redundancy.

Step 804 is an optional step and may be executed if a variable diameter exhaust vent or partially openable exhaust vent is present in the system. At step 804, a diameter of the exhaust vent may be adjusted. For example, at lower altitudes at which air pressure of the surrounding environment is higher, the variable diameter exhaust vent may have a smaller diameter to prevent air from being prematurely forced from the inflatable airbags due to the higher surrounding air pressure. At higher altitudes at which air pressure of the surrounding environment is lower, the variable diameter exhaust vent may have a larger diameter to allow air to escape from the inflatable airbags at an appropriate rate to absorb the energy from the impact of the emergency landing.

At step 806, the inflatable airbags may be rapidly inflated. For example, a chemical explosive within the airbag may be ignited to rapidly increase the pressure within the inflatable airbag, which causes the airbag to instantaneously inflate. The inflatable airbag may be made of vectran, high-strength nylon, or polyester fabric or some other surface that can withstand the friction and tearing of the emergency landing.

The inflatable airbags may be configured to remain inflated indefinitely in that they may be deflated only by external intervention. Alternatively, the inflatable airbags may be configured to remain inflated for a discrete period of time after which the inflatable airbags lose their internal pressure and become at least partially deflated without external intervention.

In the event of inflation for a discrete period of time, the size of the inflatable airbag and timing of the inflation may be determined based on the type of rotorcraft and number of inflatable airbags. For example, a larger rotorcraft will require larger and more inflatable airbags and may thus have to inflate earlier in an emergency landing event than inflatable airbags for a smaller rotorcraft. The earlier inflation may require that the inflatable airbags remain inflated longer during the emergency landing event and, therefore, may require a slower burn of the explosive chemical material. Each inflatable airbag should generally be able to attenuate about 2,000-lb of aircraft gross weight.

Step 808 is an optional step of verification that the rotorcraft 100 is no longer in motion. For example, the triggering event sensor 210 may be used to determine whether rotorcraft 100 has come to a standstill. Occupants within the rotorcraft may then be signaled that it is safe to exit the rotorcraft 100.

At step 810, the inflatable airbags may be deflated. As noted above, deflation may be automatic after a period of time. Deflation may instead be externally triggered either by human intervention or by a processor within the rotorcraft 100 that, responsive to a signal that the rotorcraft has stopped moving, causes the exhaust vent to open to the largest diameter possible. As such, any remaining air within the inflatable airbags may be expelled from the airbags by the weight of the rotorcraft.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential.

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementation.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An external airbag system for a rotorcraft, the external airbag system comprising:
   a plurality of inflatable airbags configured to be deployed externally to the rotorcraft;
   a plurality of ducts respectively coupled to the plurality of inflatable airbags;
   an exhaust vent fluidly connected to each of the plurality of inflatable airbags via the respective plurality of ducts; and a check valve located within each of the plurality of ducts and configured to prevent backflow from the plurality of ducts into each of the respective plurality of inflatable airbags;

wherein the external airbag system is configured to inflate and subsequently to deflate the plurality of inflatable airbags at substantially the same time as one another subsequent to an emergency landing event experienced by the rotorcraft, thereby preventing tipping of the rotorcraft caused by unequal inflation of at least one of the plurality of inflatable airbags relative to another one of the plurality of inflatable airbags.

2. The external airbag system of claim 1, further comprising at least one second exhaust vent coupled to the plurality of inflatable air bags.

3. The external airbag system of claim 2, wherein a first group of the plurality of inflatable air bags is coupled to the exhaust vent and a second group of the plurality of inflatable air bags is coupled to the at least one second exhaust vent.

4. The external airbag system of claim 1, wherein the exhaust vent comprises an exhaust valve, the exhaust valve being configured to open in response to application of a minimum amount of pressure build up in the external airbag system.

5. The external airbag system of claim 4, wherein the exhaust vent includes a variable diameter outlet.

6. The external airbag system of claim 5, wherein the variable diameter outlet is configured to vary in size in response to a condition of a surrounding environment surrounding the external airbag system.

7. An aircraft comprising:
a main body,
an external airbag system connected to a bottom external surface of the main body, including:
a plurality of inflatable airbags comprising a material capable of withstanding a force inflicted on the plurality of inflatable airbags during an emergency landing of the aircraft without tearing,
a plurality of ducts respectively coupled to each of the plurality of inflatable airbags, and
an exhaust vent fluidly connected to the plurality of inflatable airbags via the respective plurality of ducts;

a sensor configured to detect an inflation event and to emit a signal causing inflation of the plurality of inflatable airbags in response to the inflation event, wherein the plurality of inflatable airbags are caused to inflate at substantially the same time as one another; and a check valve located within each of the plurality of ducts and configured to prevent backflow from the plurality of ducts into each of the respective plurality of inflatable airbags;

wherein the external airbag system is configured to deflate the plurality of inflatable airbags at substantially the same time as one another subsequent to the inflation of the plurality of inflatable airbags thereby to prevent tipping of the aircraft due to unequal inflation of at least one of the plurality of inflatable airbags relative to another one of the plurality of inflatable airbags.

8. The aircraft of claim 7, further comprising at least one second exhaust vent coupled to the plurality of inflatable air bags.

9. The aircraft of claim 8, wherein a first group of the plurality of inflatable air bags is coupled to the exhaust vent and a second group of the plurality of inflatable air bags is coupled to the at least one second exhaust vent.

10. The aircraft of claim 7, wherein the exhaust vent comprises an exhaust valve, the exhaust valve being configured to open in response to application of a minimum amount of pressure build up in the external airbag system.

11. The aircraft of claim 10, wherein the exhaust vent includes a variable diameter outlet, wherein the variable diameter outlet is configured to vary in size in response to a condition of the aircraft.

12. The external airbag system of claim 1, wherein at least one of the plurality of inflatable airbags is configured to expand via a chemical explosive within the at least one of the plurality of inflatable airbags.

13. The external airbag system of claim 1, wherein the plurality of inflatable airbags comprise a material including at least one of a liquid crystal polymer (LCP) fiber, a high-strength nylon, or a polyester fabric.

* * * * *